United States Patent

[11] 3,581,059

| [72] | Inventors | Richard Breitmeyer<br>Winnenden;<br>Karl Amann, Schmiden, Germany |
|---|---|---|
| [21] | Appl. No. | 579,541 |
| [22] | Filed | Sept. 15, 1966 |
| [45] | Patented | May 25, 1971 |
| [73] | Assignee | Bauknechte GEA Electrotechnische<br>Fabriken Gesellschaft mit beschrankter<br>Haftung<br>Stuttgart, Germany |
| [32] | Priority | Sept. 17, 1965 |
| [33] | | Germany |
| [31] | | B83772 |

[54] APPARATUS FOR HEATING A STORAGE CORE OF A HEAT STORING FURNACE
4 Claims, 3 Drawing Figs.

[52] U.S. Cl. .................................................. 219/378,
165/18, 219/364, 219/492, 219/530, 236/68
[51] Int. Cl. ....................................................... F25h 7/00,
H05b 1/02
[50] Field of Search............................................ 219/378,
365, 341, 364, 530, 540, 20.4, 493, 511, 396, 398,
485, 484, 483, 399, 302, 492, 363, 325, 326;
338/59; 165/18, 12; 236/68, 46; 126/400

[56] References Cited
UNITED STATES PATENTS

| 2,769,890 | 11/1956 | Hallerberg, et al. | 219/492X |
| 2,808,494 | 10/1957 | Telkes | 219/530(UX) |
| 1,689,809 | 10/1928 | Vaughan | 219/25TUX |
| 2,149,729 | 3/1939 | Finch | 219/210UX |
| 2,434,574 | 1/1948 | Marshall | 219/365X |
| 2,498,054 | 2/1950 | Taylor | 219/364 |
| 2,949,679 | 8/1960 | MacCracken | 219/365X |
| 3,310,654 | 3/1967 | Heit | 219/296X |

FOREIGN PATENTS

| 1,404,797 | 5/1965 | France | 219/378 |
| 150,326 | 2/1953 | Australia | 219/364 |

OTHER REFERENCES

Schafer, German Application 1,112,594 published 8/1961, (1 sht. drwg.; 2 pp. Spec.) 219/364

Primary Examiner—A. Bartis
Attorney—Walter Becker

ABSTRACT: A heat storage furnace is provided with a storage core enclosed in a thermally insulated housing. Electric heating elements are provided for heating the core. A main thermal switch responsive to temperatures exteriorly of the housing deenergizes the core heating elements when a predetermined maximum temperature is exceeded. An additional thermally responsive switch is connected in series with the main thermal switch and is arranged to respond to the temperature in the immediate vicinity of an auxiliary heating element connected so as to be energized through the additional thermal switch. The auxiliary heating element is positioned in the housing and is thermally remote from the main thermal switch. The additional thermal switch cyclically opens and closes the circuit to the core heating elements during the charging period before the temperature at the exterior of the housing exceeds the predetermined maximum and the main thermal switch deenergizes the heating elements to terminate the charging period.

Inventors:
RICHARD BREITMEYER
KARL AMANN

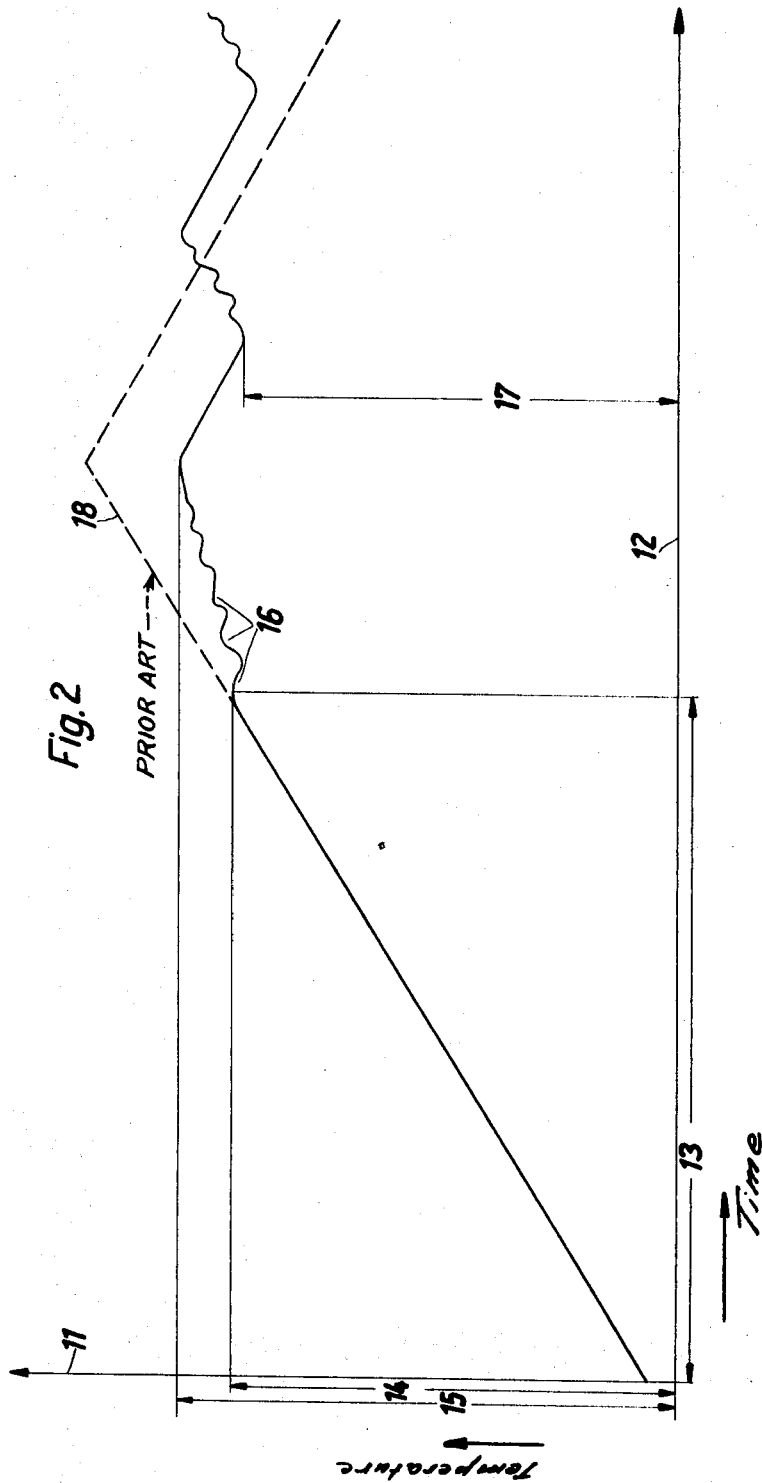

APPARATUS FOR HEATING A STORAGE CORE OF A HEAT STORING FURNACE

The present invention relates to a method of and device for heating up the storage core of a heat storing furnace by means of electric heating bodies the circuit of which is controlled through the intervention of a thermally controlled element as for instance, a thermostat.

It is known to heat up heat storing furnaces of the abovementioned type by having the heating body effective without interruption until the storage core has reached its admissible predetermined maximum temperature. As soon as this temperature has been reached, the heating bodies are by means of a thermostat responsive to the said maximum temperature turned off and are turned on again only when the temperature of the storage core has dropped below a certain minimum temperature. As a rule, the temperature at which the storage core is turned off and turned on, is measured outside on the storage core or in the heat insulation or at an insulated partition.

The storage core of the heat storing furnace has a poor heat conductivity, and the temperature of the storage core is greater towards or nearer to the heating bodies. The hottest zone of the storage core therefore is located in the direct neighborhood of the heating body. The areas with the lowest temperature of the storage core are frequently by from 100° to 200° C. cooler than the zones or portions of the storage core located in the vicinity of the heating bodies. In view of the relatively high temperature of the storage core within the zone or region of the heating bodies, the said heating bodies are exposed to a particularly high thermal load which greatly affects their life span.

Furthermore, in view of the greatly varying temperature distribution within the storage core, a precise turning off of the heat supply to the storage core when a certain heat capacity has been reached is not assured. When the temperature control device, at the end of the charging, turns off the heat supply, an equalization of the temperature differences within the storage core will take place. The temperature in the heat insulation surrounding the storage core increases likewise and for a long time after turning off the heat, the insulation will have a mean temperature which prevents the controlling device from being turned on again. This is disadvantageous, when the possibility of an additional postheating the storage core exists.

It is, therefore, an object of the present invention to provide a method of and apparatus for heating up the storage core of a heat storing furnace which will assure a safe operation of a heat storing furnace.

It is another object of this invention to provide a device for heating up the storage core of a heat storing furnace, in which the heating bodies of the heat storing furnace will have a long life.

Still another object of this invention consists in the provision of an apparatus for heating the storage core of the heat storing furnace which will provide a simple control of the furnace.

These and other objects and advantages of the present invention will appear more clearly from the following specification in connection with the accompanying drawings.

In a method for heating up the storage core of a heat storing furnace by means of electric heating elements therein, the circuit of which is controlled through a thermostat, it is provided according to the present invention that the storage core is heated in steps or in intervals to the desired or predetermined end temperature, while following each heating interval at least a partial heat equalization is permitted within the storage core. In this way, it will be assured that the storage core will over its entire cross section always have approximately the same temperature. Since, due to the intervals between the heating intervals heat is conveyed from the region of the storage core in which the heating elements are arranged to further spaced regions the heating elements or heating bodies are exposed to a relatively low load so that their life span is considerably increased.

A device for carrying out the method according to the present invention is provided with a thermally controlled main member which at the realization of the predetermined storage core temperature opens the circuits for the heating elements and at a temperature drop below said predetermined storage core temperature closes the circuit, and is further characterized primarily in that in the main circuit of this main control member there is arranged a further control member for the step-wise heating of the storage core. This additional control member will, when the circuit is closed by the thermally controlled main member, at predetermined intervals open and close the circuit. While the second or additional control member brings about the turning on and off of the heating elements at intervals, the main control member will, when the end temperature has been realized, turn off the heating elements until the temperature of the heating bodies had dropped below a predetermined temperature.

According to a further feature of the present invention, the interval control member is formed by a thermally controlled switch member which will assure a safe function of the device. Expediently, an additional heating element is provided in the circuit of the core heating elements and arranged in the vicinity of the temperature feeler of said thermally controlled internal member. The additional heating element is effective upon the thermally controlled interval control member. By means of said additional heating element, the control times of the interval control member will be controlled.

A further advantageous embodiment of the invention is realized by arranging the temperature feeler of the interval control member and the temperature feeler of the main control member at a greater distance from each other in such a way that the temperature feeler of the main control member will be located outside the heating zone or region of the additional heating element and will close and open the circuit independently of said interval control member solely on the basis of the temperature of the storage core.

In the drawings:

FIG. 1 diagrammatically illustrates a heat-storing furnace according to the invention.

FIG. 2 is a time-temperature diagram showing the conditions during the heating up of the storage core.

Figure 1:
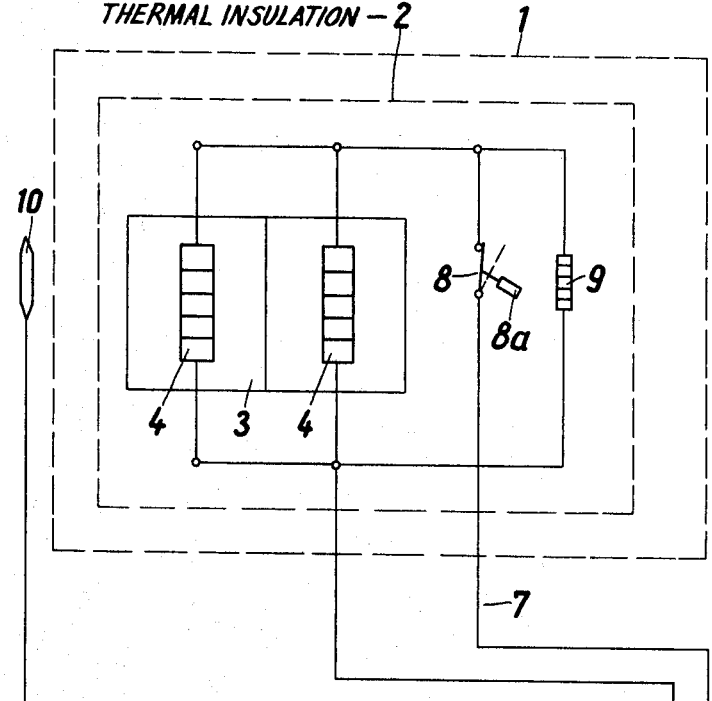

As will be seen from FIG. 1 a heat storage furnace has a housing 1 in which is arranged a storage core 3 with electric heating bodies 4, said storage core being surrounded by an insulation 2. The heating bodies 4 are through the intervention of a thermally controlled main switch 5 connected to a current source 6.

With the embodiment illustrated in FIG. 1, the conductor 7 pertaining to the parallelly arranged heating bodies 4 has interposed therein a thermally controlled interval switch 8 in the vicinity of which there is provided an additional control heating element 9. Element 9 is likewise arranged in parallel with regard to the heating bodies 4 of the storage core 3.

As will be evident from FIG. 1, the heat feeler 10 of the main switch 5 is arranged in the vicinity of the outer wall of housing 1 of the heat storage furnace. When the temperature of the outer wall of housing 1 drops below a predetermined selected temperature, the thermally controlled main switch 5 closes the circuit 7 so that the heating bodies 4 of the storage core 3 and the additional control heating element 9 will give off heat. The heat emitted by the control heating element 9 affects the temperature feeler 8a of the interval switch 8 so that the interval switch 8 operated by feeler 8a will move into the dash position, i.e. will open the circuit for conductor 7.

As a result thereof, no current is fed to heating bodies 4 and the control heating element 9 so that the temperature within the zone of the temperature feeler 8a of the interval switch 8 drops, and switch 8 will again be closed, whereupon as the temperature increases it will again open and the play will be repeated.

When the outer wall of housing 1 of the heat storage furnace has reached a predetermined selected temperature, the main switch 5 will through the intervention of the heating feeler 10 operatively connected thereto be opened so that the heating up of the storage core 3 will be interrupted in intervals. This interval heating up will be effected again only when the outer wall of housing 1 drops below the said predetermined temperature.

The temperature at which switch 5 will open and close the circuit for line 7 can be adjusted by means of variable temperature adjusting element 5a.

According to the diagram of FIG. 2, the temperature has been plotted over the ordinate 11, whereas the time has been plotted over the abscissa 12. In conformity with the method according to the invention, and by means of the device described above, the storage core 3 is during a certain time interval 13 heated up linearly and in a continuous manner from room temperatures to a predetermined temperature 14. When this temperature 14 has been reached, the interval switch 8, opens the switch for line 7, 7a of the heating bodies 4 at certain intervals so that the further heating up of the storage core 3 to the selected maximum temperature 15 will be effected at intervals 16. When this maximum temperature 15 has been reached, the thermally affected main switch 5 opens the circuit 7 of the heating bodies 4 until the temperature again drops below a predetermined temperature, whereupon storage core 3 will again be heated up at intervals.

Dash line 18 of FIG. 2 illustrates the heretofore customary method for heating up the storage core 3 according to which the heating up was affected linearly and in a continuous manner to a maximum value, whereupon the supply of current to the heating bodies 4 was turned off, and the storage core 3 cooled off again. In order to assure a more effective heating of a room, it is necessary with the heretofore known method to heat up the storage core to a considerably higher temperature than with the method according to the present invention.

Figure 3:
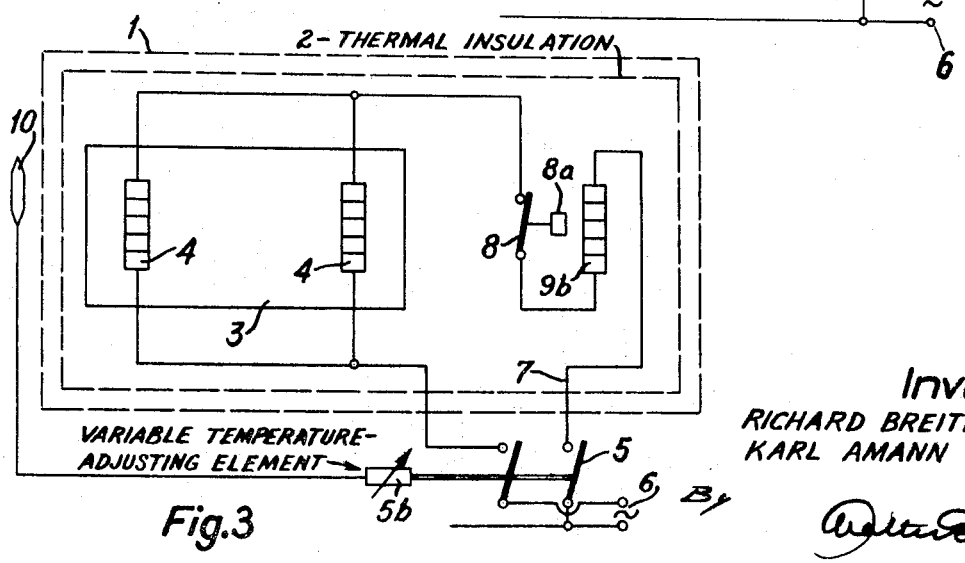
FIG. 3 illustrates a further embodiment of the invention.

FIG. 3 is an arrangement that differs in that the auxiliary heater 26 is located directly in the supply line. This embodiment differs from that of FIG. 1 only thereby that the additional heating element 9b is not parallel but rather series connected with respect to heating element 4 as clearly recognizable in the drawings.

It is, of course, to be understood that the present invention is, by no means, limited to the particular methods and arrangements set forth above in connection with the drawings but also comprises any modifications within the scope of the appended claims.

We claim:

1. In a heat storage furnace means having a storage core enclosed in a termal insulating material mass and a housing surrounding the insulating mass, having core heating elements arranged within the storage core, and having circuit connection to a current supply line for the core heating elements through a normally closed main switch, the improvement in combination therewith which comprises a main temperature feeler means which is located externally of the housing and which measures temperature in the vicinity of the exterior of the housing and which opens the main switch when and so long as the measured temperature exceeds a particular maximum value, a normally closed additional switch means connected in series with said main switch, an auxiliary heating element thermally remote from the zone of the main feeler means and circuit connected to said supply line through said additional switch means, and an auxiliary temperature feeler means that measures temperature in immediate proximity to said auxiliary heating element and that is effective to open said additional switch means when and so long as the measured temperature of said auxiliary heating element exceeds a particular maximum value so selected that said additional switch means is cyclically opened and closed before the temperature in the vicinity of the exterior of the housing reaches the particular maximum value and the main switch is opened.

2. An improvement according to claim 1, in which said auxiliary heating element and auxiliary temperature feeler means are positioned within the insulating mass.

3. An improvement according to claim 1, in which said auxiliary heating element and core-heating elements are connected in parallel relative to each other.

4. An improvement according to claim 1, in which said auxiliary heating element and core-heating elements are connected in series relative to each other.